United States Patent [19]

Takahashi

[11] Patent Number: 5,475,841
[45] Date of Patent: Dec. 12, 1995

[54] SYSTEM FOR INPUTTING ONE IDENTIFICATION NUMBER CORRESPONDING TO DATA OF APPLICATION PROGRAM FROM PARTITIONED AREA BY PRESSING FUNCTION KEY IN AN OPERATION OF APPLICATION PROGRAM

[75] Inventor: Nobutaka Takahashi, Nara, Japan

[73] Assignee: Sharp Kabushiki Kaisha, Osaka, Japan

[21] Appl. No.: 67,328

[22] Filed: May 21, 1993

[30] Foreign Application Priority Data

May 26, 1992 [JP] Japan .................... 4-133827

[51] Int. Cl.$^6$ .................................................. G06F 15/40
[52] U.S. Cl. .................. 395/700; 395/497.01; 395/161; 364/419.07; 364/419.13; 364/419.19; 364/DIG. 1
[58] Field of Search .................... 395/200, 700, 395/425, 375, 600, 500, 650, 800, 144–161; 364/419.13, 419.07, 419.08, 419.15, 419.19, 401, 918, 918.2, 927, 927.2, 928, 928.1, 928.2, 928.3, 946.2, 946.3

[56] References Cited

U.S. PATENT DOCUMENTS

| | | | |
|---|---|---|---|
| 4,439,837 | 3/1984 | Aiena et al. ........................... | 364/900 |
| 4,591,974 | 5/1986 | Dornbush ............................... | 364/200 |
| 4,633,430 | 12/1986 | Cooper .................................... | 364/900 |
| 4,688,189 | 8/1987 | Hirata .................................... | 364/900 |
| 4,775,956 | 10/1988 | Kaji et al. ............................. | 364/419 |
| 4,851,994 | 7/1989 | Toda et al. ............................ | 364/200 |
| 4,970,681 | 11/1990 | Bennett ................................... | 364/419 |
| 4,973,960 | 11/1990 | Mount ..................................... | 341/23 |
| 4,991,094 | 2/1991 | Fagan et al. .......................... | 364/419 |
| 5,103,498 | 4/1992 | Lanier et al. ......................... | 364/419 |
| 5,148,541 | 9/1992 | Lee et al. ............................... | 395/600 |
| 5,181,163 | 1/1993 | Nakajima et al. .................... | 364/419 |
| 5,247,614 | 9/1993 | Eagen et al. .......................... | 395/200 |
| 5,257,185 | 10/1993 | Farley et al. ......................... | 364/419.19 |
| 5,289,393 | 2/1994 | Kaya ...................................... | 364/705.08 |
| 5,333,256 | 7/1994 | Green et al. .......................... | 395/159 |

FOREIGN PATENT DOCUMENTS

| | | |
|---|---|---|
| 3-240396 | 10/1991 | Japan . |
| 4-1843 | 1/1992 | Japan . |
| 2137783A | 10/1984 | United Kingdom . |
| 2238144A | 5/1991 | United Kingdom . |

OTHER PUBLICATIONS

Wm. Wickes & C. M. Patton, "The HP 48SX Scientific Expandable Calculator: Innovation and Evolution," *Hewlett–Packard Journal*, Jun. 1991, vol. 42, No. 3, pp. 6–12 (Palo Alto, Calif.).

*Primary Examiner*—Thomas C. Lee
*Assistant Examiner*—Moustafa Mohamed Meky
*Attorney, Agent, or Firm*—David G. Conlin; Peter F. Corless; Milton Oliver

[57] ABSTRACT

A data communicating apparatus adapted to be used in a small-sized personal instrument on a receiving side and arranged that data groups of a plurality of applications in a small-sized personal instrument on a transmitting side is used in the small-sized personal instrument on the receiving side, includes a unit for storing a plurality of data correlated each other in a state of keeping a correlation of each data according to a predetermined method, a unit connected to the storing unit for outputting the plurality of data stored in the storing unit, and a unit connected to both the storing unit and the outputting unit for controlling both the storing unit and the outputting unit in such a manner that the plurality of data are output from the storing unit with the state of keeping the correlation.

6 Claims, 14 Drawing Sheets

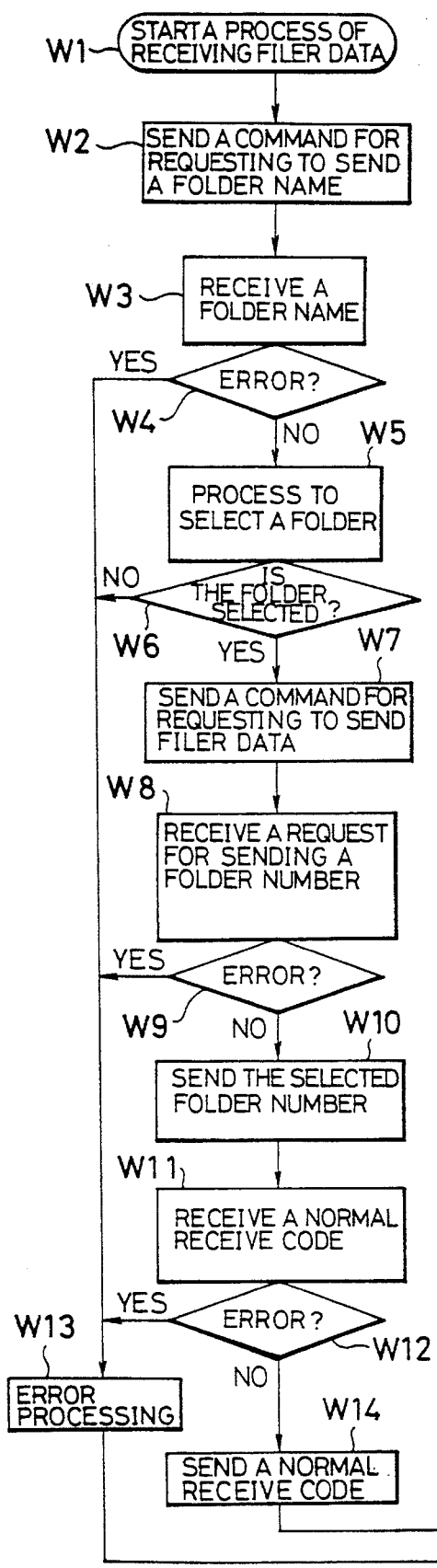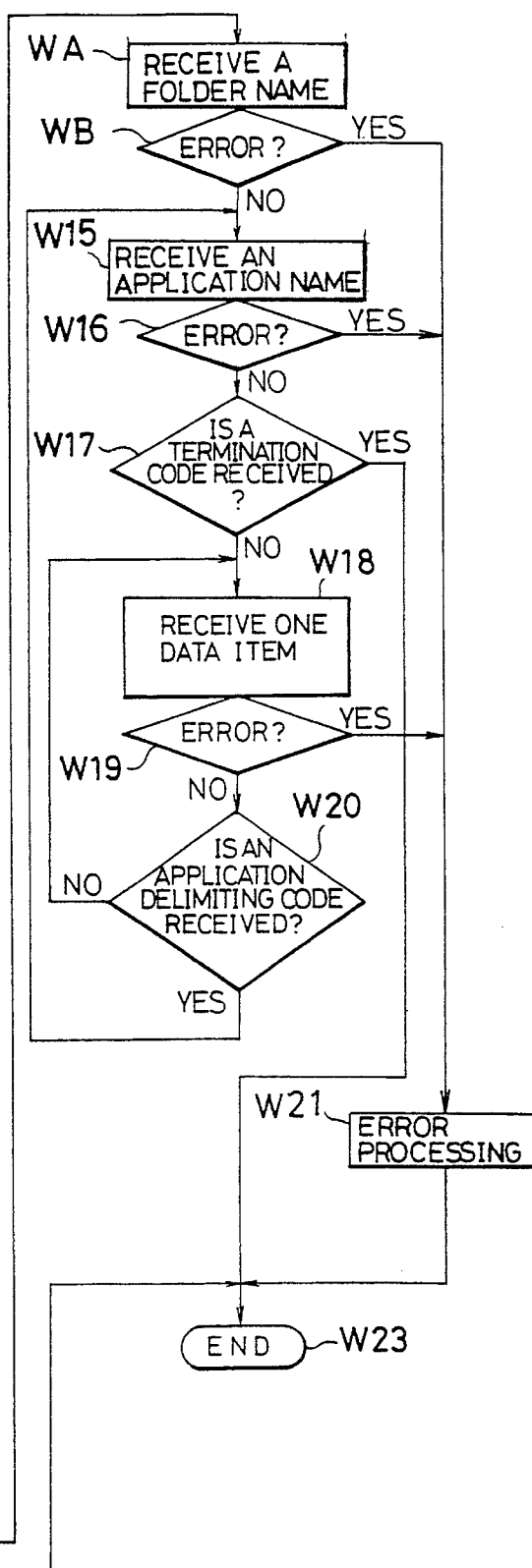
Fig. 10

Fig. 11

FOLDER NUMBER

FOLDER NAME

DELIMITING CODE

FOLDER NUMBER

FOLDER NAME

DELIMITING CODE

FOLDER NUMBER

FOLDER NAME

DELIMITING CODE

TERMINATION CODE

SYSTEM FOR INPUTTING ONE IDENTIFICATION NUMBER CORRESPONDING TO DATA OF APPLICATION PROGRAM FROM PARTITIONED AREA BY PRESSING FUNCTION KEY IN AN OPERATION OF APPLICATION PROGRAM

BACKGROUND OF THE INVENTION

1. Field of the Invention

The present invention relates to a data communicating apparatus which is used for a small-sized personal instrument, and more particularly to the data communicating apparatus which is capable of managing data held by a plurality of applications in a one-dimensional manner.

2. Description of the Related Art

The inventors of the present invention know that a data communicating apparatus used for a small-sized personal instrument provides applications for managing respective ones of data items. For each of the applications, only data communication for one piece of data or for all pieces of data is executed. To communicate data between two or more applications, the data communication for all the data items in the small-sized personal instrument is carried out.

The above mentioned data communicating apparatus has no function of one-dimensionally managing data in a plurality of applications, and a particular data item is managed by a particular application only.

Hence, the above mentioned data communicating apparatus has a shortcoming that although a certain data item is correlated with another data item managed by another application with respect to a specific matter, when performing data communication, data communication has to be done one data item for one application at one time.

SUMMARY OF THE INVENTION

It is therefore an object of the present invention to provide a data communicating apparatus in which a data group in two or more applications provided in a small-sized personal instrument on the transmitting side is used in a small-sized personal instrument on the receiving side.

The object of the present invention can be achieved by a data communicating apparatus adapted to be used in a small-sized personal instrument on a receiving side and arranged that data groups of a plurality of applications in a small-sized personal instrument on a transmitting side is used in the small-sized personal instrument on the receiving side, includes a unit for storing a plurality of data correlated each other in a state of keeping a correlation of each data according to a predetermined method, a unit connected to the storing unit for outputting the plurality of data stored in the storing unit, and a unit connected to both the storing unit and the outputting unit for controlling both the storing unit and the outputting unit in such a manner that the plurality of data are output from the storing unit with the state of keeping the correlation.

The data communicating apparatus further includes a unit connected to the controlling unit for inputting data and instructions, a unit for displaying the data and/or the instruction input by the inputting unit, and a unit connected both the controlling unit and the displaying unit for driving the displaying unit according to the controlling unit.

The inputting unit includes a plurality of function keys and is so arranged that one of the plurality of function keys is pressed for registering data onto an application for data management at a time when entering and/or displaying the data in an application program.

The inputting unit is further arranged that the application holding the data is invoked for displaying and modifying the data with a simple key operation through the controlling unit.

The displaying unit is so arranged that the registered data from the inputting unit is displayed and listed on the displaying unit at a time when the application for data management is in operation, and the application for data management enabling to store up to a plurality of data groups.

In operation, the data communicating apparatus according to the present invention, the storage unit serves to store the plurality of correlated data items in a manner to keep the correlated relation among those data items, based on the predetermined method. The output unit serves to output the plurality of data items stored in the storage unit. The control unit is connected to the storage unit and the output unit and serves to control the storage unit and the output unit in a manner to output the plurality of data items while keeping the correlated relation among those data items.

The data communicating apparatus according to the invention provides storage unit for storing a plurality of correlated data items as keeping a correlated relation between the data items based on a predetermined method, output unit for outputting the plurality of data items stored in the storage unit, and control unit being connected to the storage unit and the output unit and for controlling the storage unit and the output unit in a manner to output the plurality of data items as keeping the correlated relation. Hence, the data communication is allowed to be done without having to lose the correlating relation of the data on the sending side.

BRIEF DESCRIPTION OF THE DRAWINGS

FIG. 10 is a flowchart for explaining the operation of receiving filer data on the side of the personal computer composing the communicating system shown in FIG. 4;

FIG. 11 is an explanatory view showing one example of a folder name transfer format;

DESCRIPTION OF THE PREFERRED EMBODIMENTS

Referring to the accompanying drawings, a preferred embodiment of a data communicating apparatus according to the present invention will be described in detail.

Figure 1:
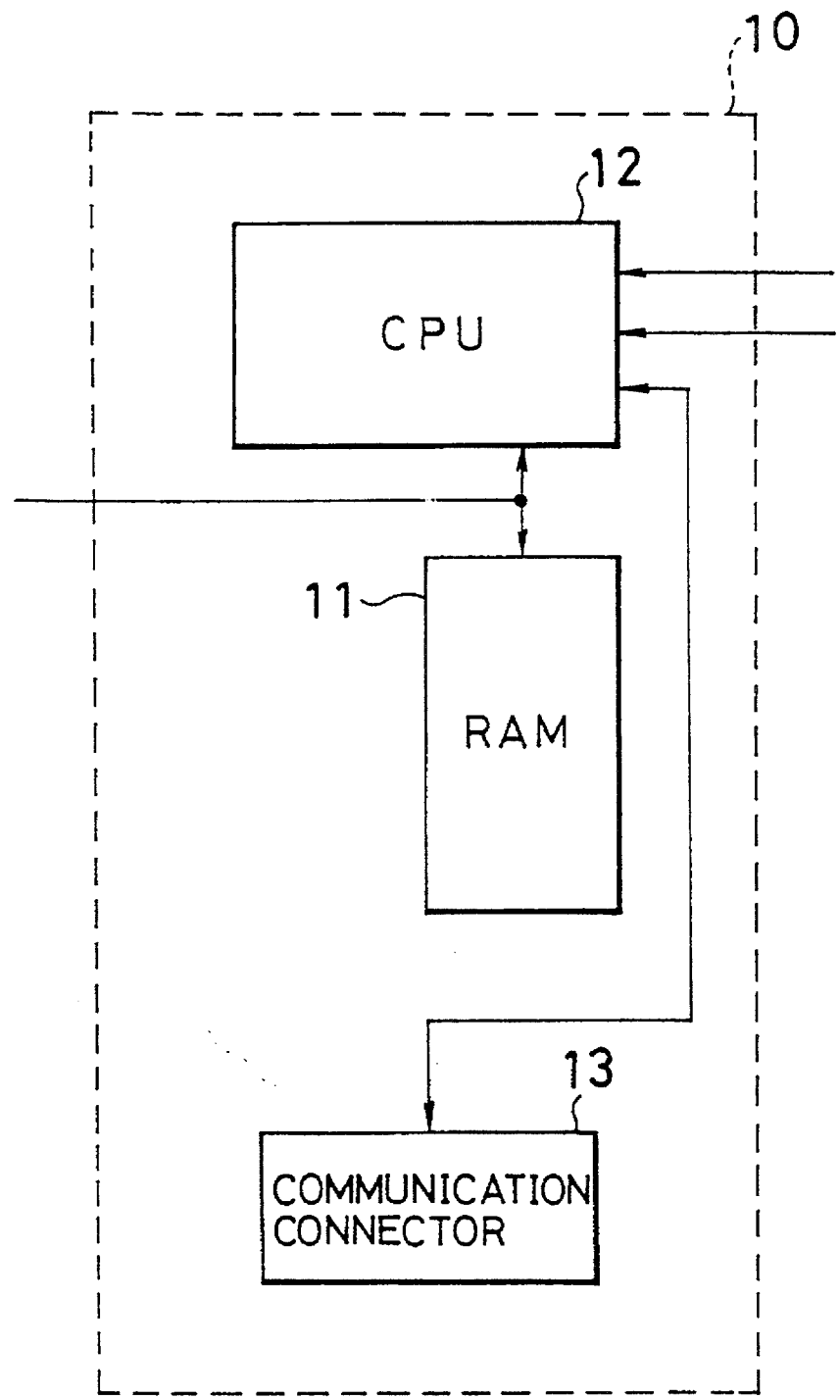
FIG. 1 is a block diagram showing an arrangement of an essential part of a data communicating apparatus according to the present invention.

FIG. 1 shows an essential part of the data communicating apparatus according to the present embodiment.

The essential part 10 in the data communicating apparatus according to this embodiment is arranged to have a random access memory (RAM) 11 served as storage means, a central processing unit (CPU) 12 served as control means and connected to the RAM 11, and a communication connector 18 served as output means and connected to the CPU 12.

Figure 2:
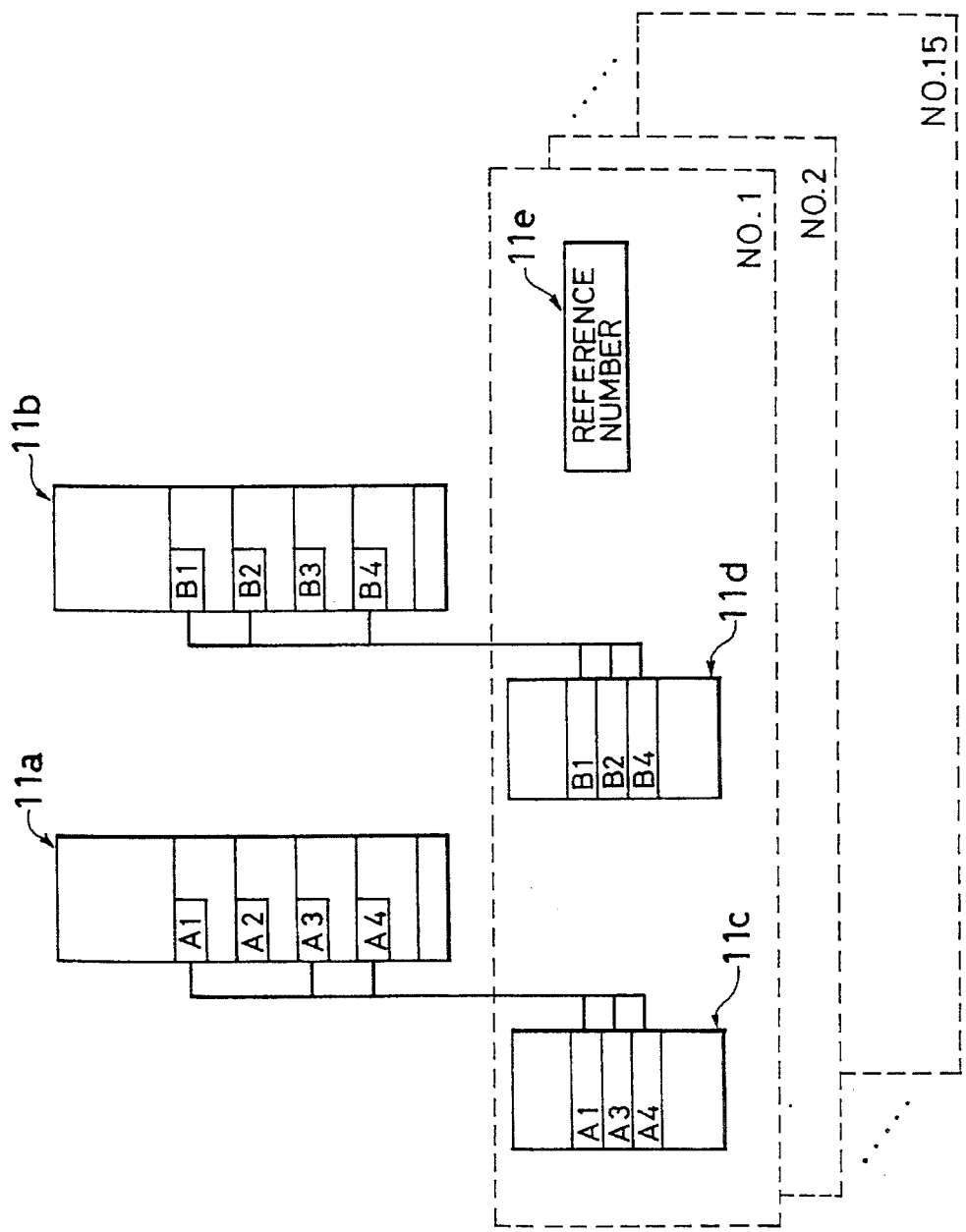
FIG. 2 is an explanatory view showing a format of data stored in a RAM shown in FIG. 1.

FIG. 2 is one format of data stored in the RAM 11 shown in FIG. 1.

In FIG. 2, the portions indicated by reference numbers 11a and 11b stand for storing formats of data in an application program provided in a small-sized personal instrument. Each component stores numbers (referred to as data identification numbers) A1, A3, A4, B1, B2, B4 for identifying individual data items A2, B3, and A2, B3 input by a user.

Registering data onto an application for data management (hereinafter, the application for data management is referred to as a filer), a user presses a specific key (see FIG. 3) when entering or displaying data in one's application program. The registered data is listed on a liquid crystal display (LCD) (see the reference number 17 of FIG. 3) when the filer is in operation. With a simple key operation, the application holding the data is invoked for displaying and modifying the data.

The portions indicated by reference numbers 11c and 11d of FIG. 2 stand for data structure for management used by the filer and store the data identification numbers A1, A3, A4, B1, B2, and B4.

These management data items are prepared for all the application programs in order to collectively manage a data group registered by a user.

According to this embodiment, each filer can store up to 15 data groups (referred to as a folder). A name can be given to each of the folders from No. 1 to No. 15. Those given names are stored in a portion indicated by a reference number 11e.

Figure 3:
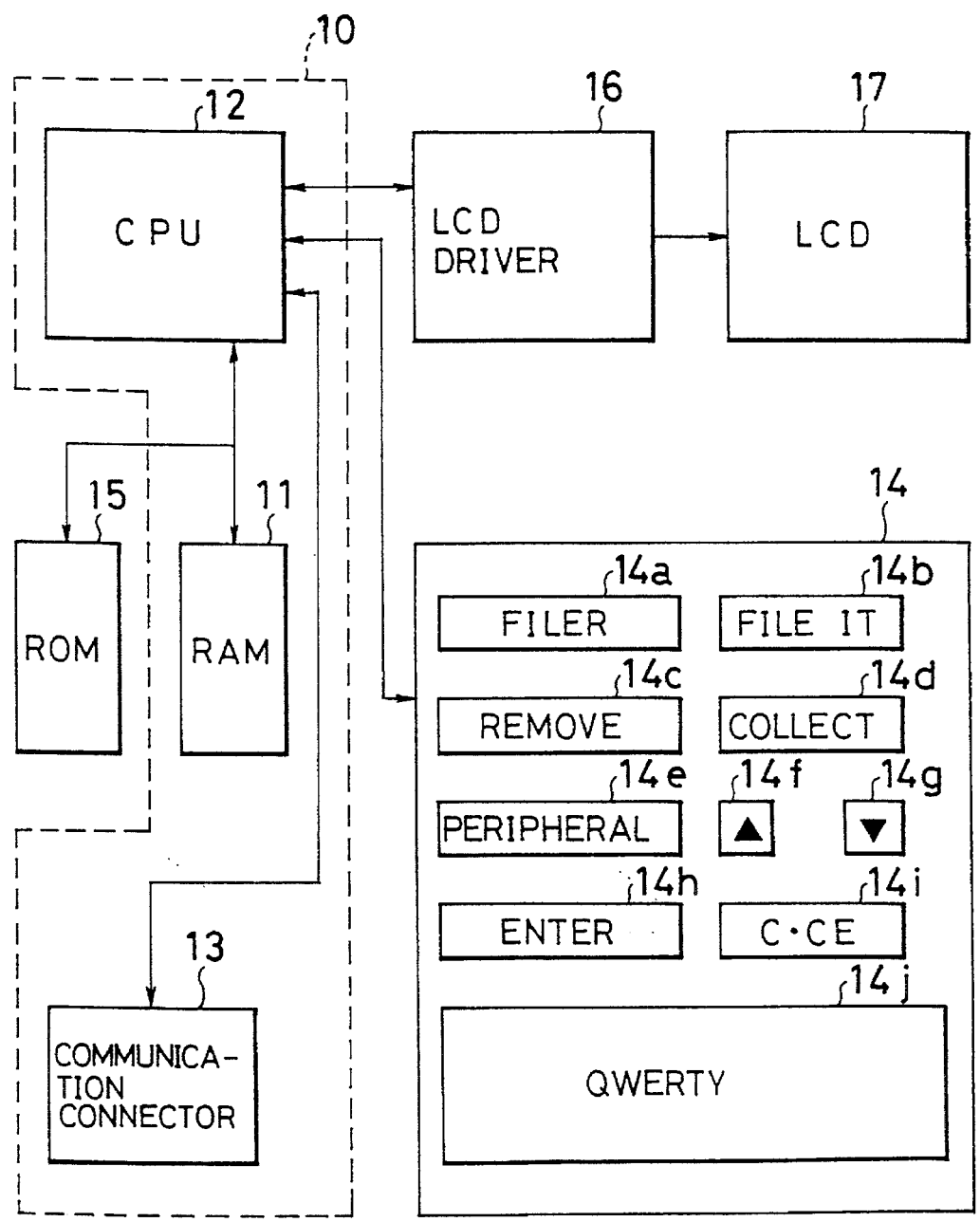
FIG. 3 is a block diagram showing one arrangement of a small-sized personal instrument which corresponds to one embodiment of a data communicating apparatus providing the essential part shown in FIG. 1.

FIG. 3 shows one arrangement of a small-sized personal instrument provided with the essential part 10 of FIG. 1.

The small-sized personal instrument shown in FIG. 3 is arranged to have a keyboard 14 connected to the CPU 12 of the essential part 10, a read-only memory (ROM) 15 connected to the CPU 12 and the RAM 11, an LCD driver 16 connected to the CPU 12 and an LCD 17 connected to the LCD driver 16.

The keyboard 14 provides a [FILER] key 14a, a [FILE IT] key 14b, a [REMOVE] key 14c, a [COLLECT] key 14d, a PERIPHERAL] key 14e, a [?] key 14f, a [?] key 14g, an [ENTER] key 14l, a [C.CE] key 14i, and a [QWERTY] key 14j.

The [FILER] key 14a is a key for starting the filer. The [FILE IT] key 14b is used for registering data in the filer while another application is executed. The [REMOVE] key 14c is used for deleting the data registered before. The [COLLECT] key 14d is used for retrieving data. The retrieved data is allowed to be registered by the [FILE IT] key 14b.

To register data in the filer, each user presses the [FILE IT] key 14b when data is input or displayed in the corresponding application program. The registered data is listed on the LCD 17 while the filer is in operation. With a predetermined key operation, an application holding this data is invoked in order to display and modify the data.

Figure 4:
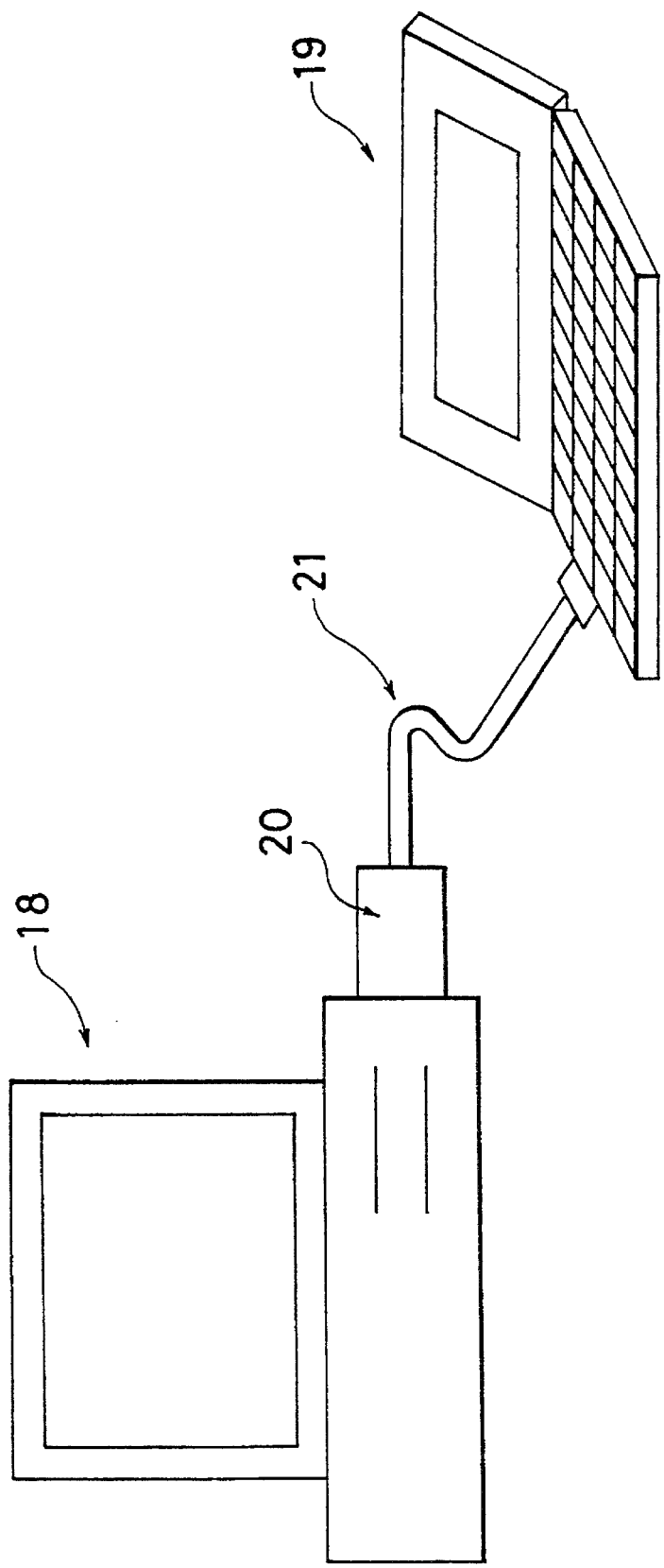
FIG. 4 is a schematic explanatory view showing one arrangement of a communicating system provided with the data communicating apparatus shown in FIG. 3.

FIG. 4 shows one arrangement of a communication system provided with the data communicating apparatus according to this embodiment.

As shown in FIG. 4, the communication system provides a personal computer 18, a small-sized personal instrument 19, a level converter 20 connected to the personal computer 18, and a cable connected between the level converter 20 and the small-sized personal instrument 19.

Next, the description will be oriented to the operation on the side of the small-sized personal instrument with respect to the data communication between the personal computer 18 and the small-sized personal instrument 19 included in the communication system shown in FIG. 4, in particular, the communication of the data registered by the filer.

Figure 5:
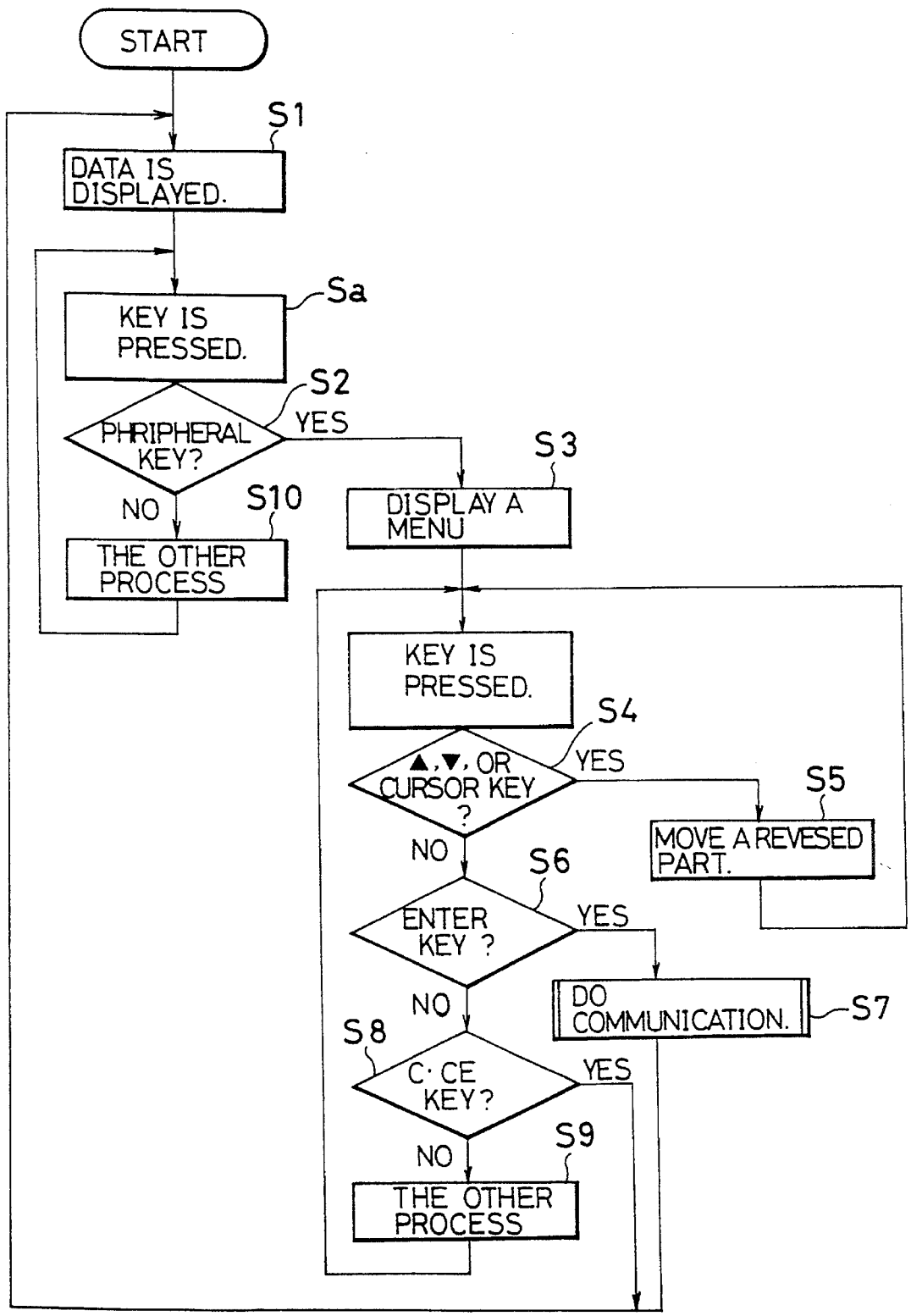
FIG. 5 is a flowchart for explaining an operation of the small-sized personal instrument shown in FIG. 4 while data of one application is being displayed.

FIG. 5 is a flowchart showing an operation of the communication system shown in FIG. 4, in particular, the small-sized personal instrument while data of one application is displayed.

Figure 6:
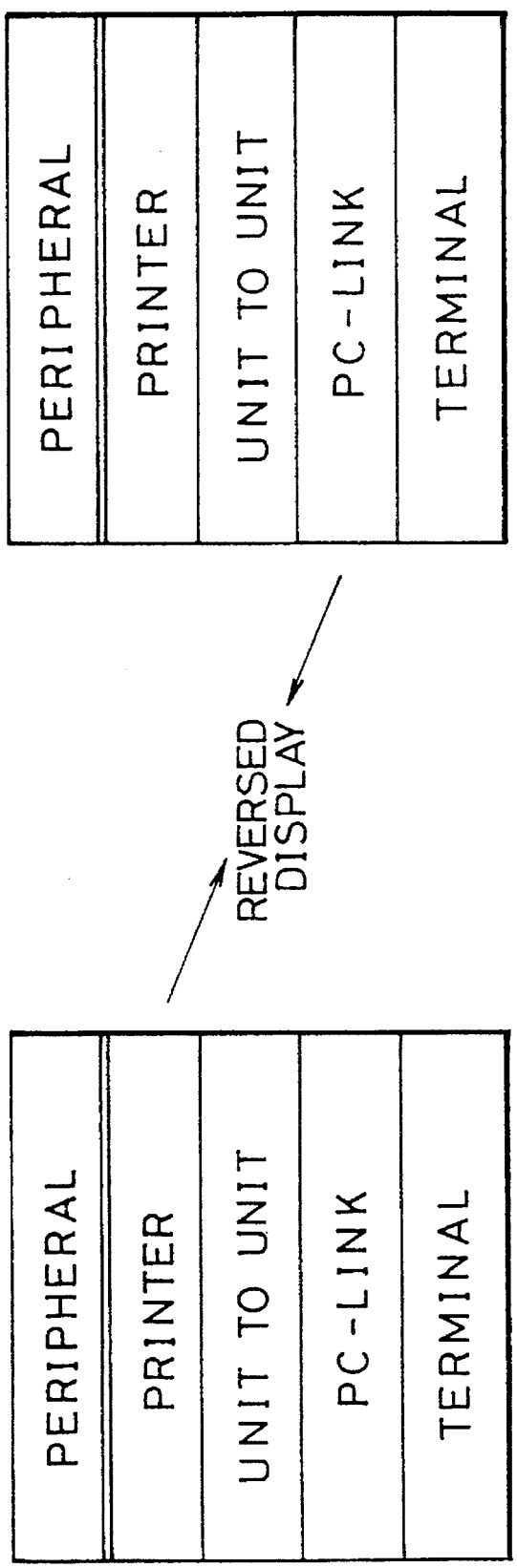
FIG. 6 composed of FIG. 6a and FIG. 6b is an explanatory view showing a reversed part displayed as a menu while data of FIG. 5 is being displayed.

While data is displayed (step S1), the [PERIPHERAL] key 14e (see FIG. 3) is pressed (step S2). The menu shown in FIG. 6a is displayed (step S3). Then, the [?] key 14g (see FIG. 3) is pressed twice (step S4) so that a reversed portion may be moved to the place of PC-LINK as shown in FIG. 6b (step S5). By pressing the [ENTER] key 14h (see FIG. 3) (step S6), the communication processing is started (step S7).

If the [C.CE] key 14j is input (step S8), at the step S6, when the [ENTER] key 14h is not input, the operation goes to the step S1. If the [C.CE] key 14j is not input, the other process is executed (step S9) and then the operation goes back to the step S4.

If, at the step S2, the [PERIPHERAL] key 14e is not input, the other process is executed (step S10). and the operation goes back to the step S2.

Next, the description will be oriented to the operation of processing communication between the personal computer 18 and the small-sized personal instrument 19 included in the communication system shown in FIG. 4.

In the communication processing, after setting the start input/output (I/O) instruction (referred to as SIO) and opening the SIO, a command from the personal computer is awaited. By receiving the command, the data of the filer is sent or received.

At first, the transmission of the filer data (from the small-sized personal instrument 19 to the personal computer 18) will be described as referring to a flowchart for executing communication processing on the side of the small-sized personal instrument 19 shown in FIG. 7, a flowchart for sending a folder name on the side of the small-sized personal instrument 19 shown in FIG. 8, a flowchart for sending filer data on the side of the small-sized personal instrument 19 shown in FIG. 9, and a flowchart for receiving filer data on the side of the personal computer 19 shown in FIG. 10.

Figure 7:
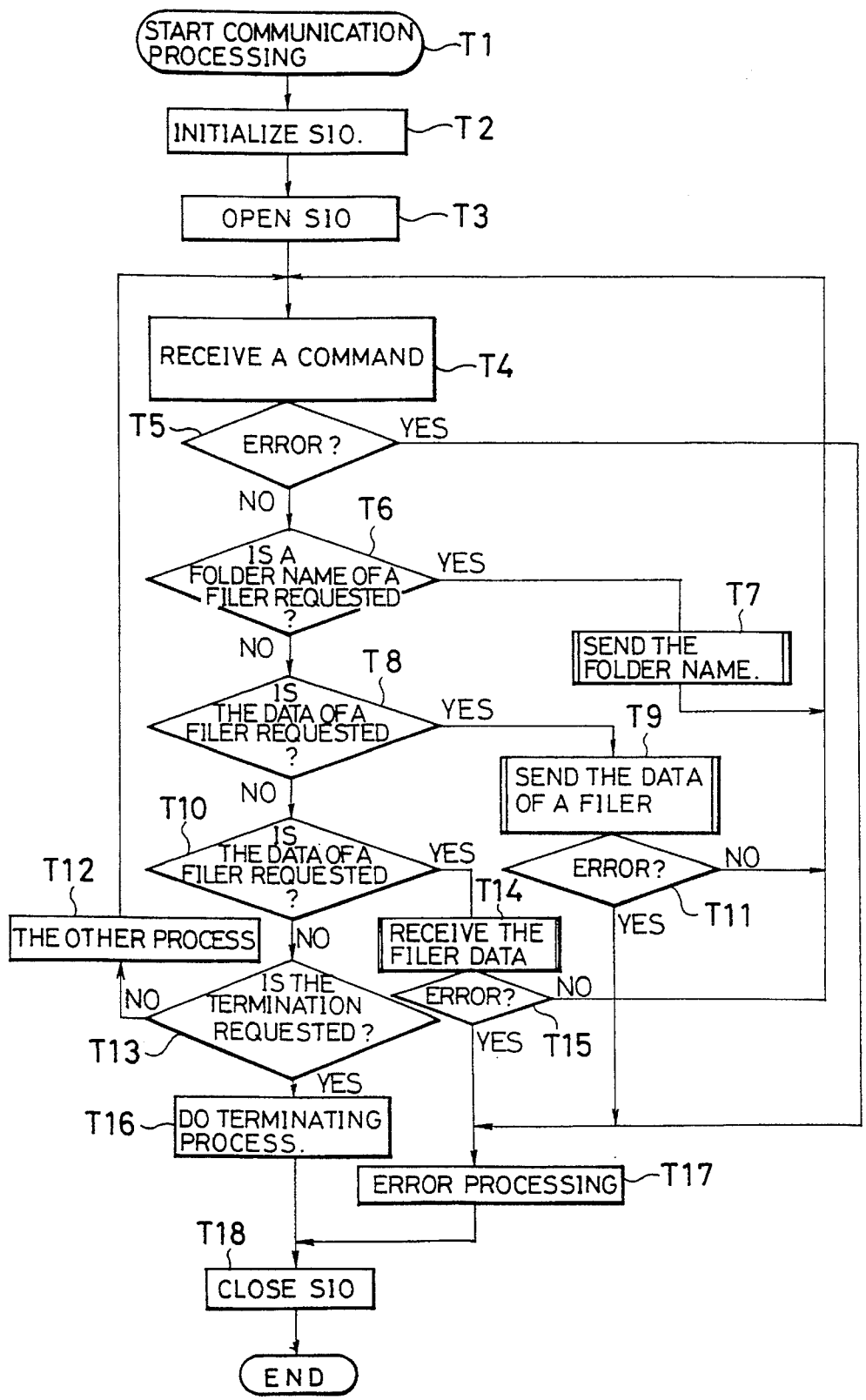
FIG. 7 is a flowchart for explaining the operation of the communicating process on the small-sized personal instrument composing the communicating system shown in FIG. 4.

As shown in the flowchart of FIG. 7, for executing communication processing on the side of the small-sized personal instrument 19, the steps of starting communication processing (step T1), initializing SIO (step T2), opening SIO (step T3), receiving a command (step T4), checking whether or not it is an error (step T5), if it is an error at step T5, then proceeds to step S17 (described later). If it is not an error at step T5, then checking whether or not a folder name of a filer is requested (step T6), if the folder name of the filer is requested at step T6, then processing of sending the folder name (step T7), and the process returns to step T4. If the folder name of the filer is not requested at step T6, then checked whether or not it is a request of sending data of a filer (step T8), if it is the request of sending the data of the filer at step T8, then processing of sending the data of the filer (step T9), then checking whether or not it is an error (step T10), if it is an error at step T10, proceeds to step T17 (described later). If it is not an error at step T10, then the process returns to the step 4.

If it is not the request of receiving data of the filer at step T8, then checking whether or not it is a request of receiving data of a filer (step T11), and if it is not the request of receiving data of the filer at step T11, then checking whether or not it is a request of a termination (step T12), if it is not the request of the termination at step T12, then processing other process (step T13) and returns to step T2. If it is the request of the termination at step T12, then executing the termination processing (step T14) and closing the SIO (step T15).

If it is the request of receiving data of the filer at step T11, then processing of receiving data of the filer (step T16), and checking whether or not it is an error (step T17), if it is not an error at step T17, returns to step T4. If it is an error at step T16, then executing an error processing (step T18) and proceeds to step T15 for closing the SIO.

As described above, in order for a user to select the folder whose data is to be sent to the personal computer 18 on the side of the personal computer 18, a request for sending a folder name is issued to the small-sized personal instrument 19.

Figure 8:
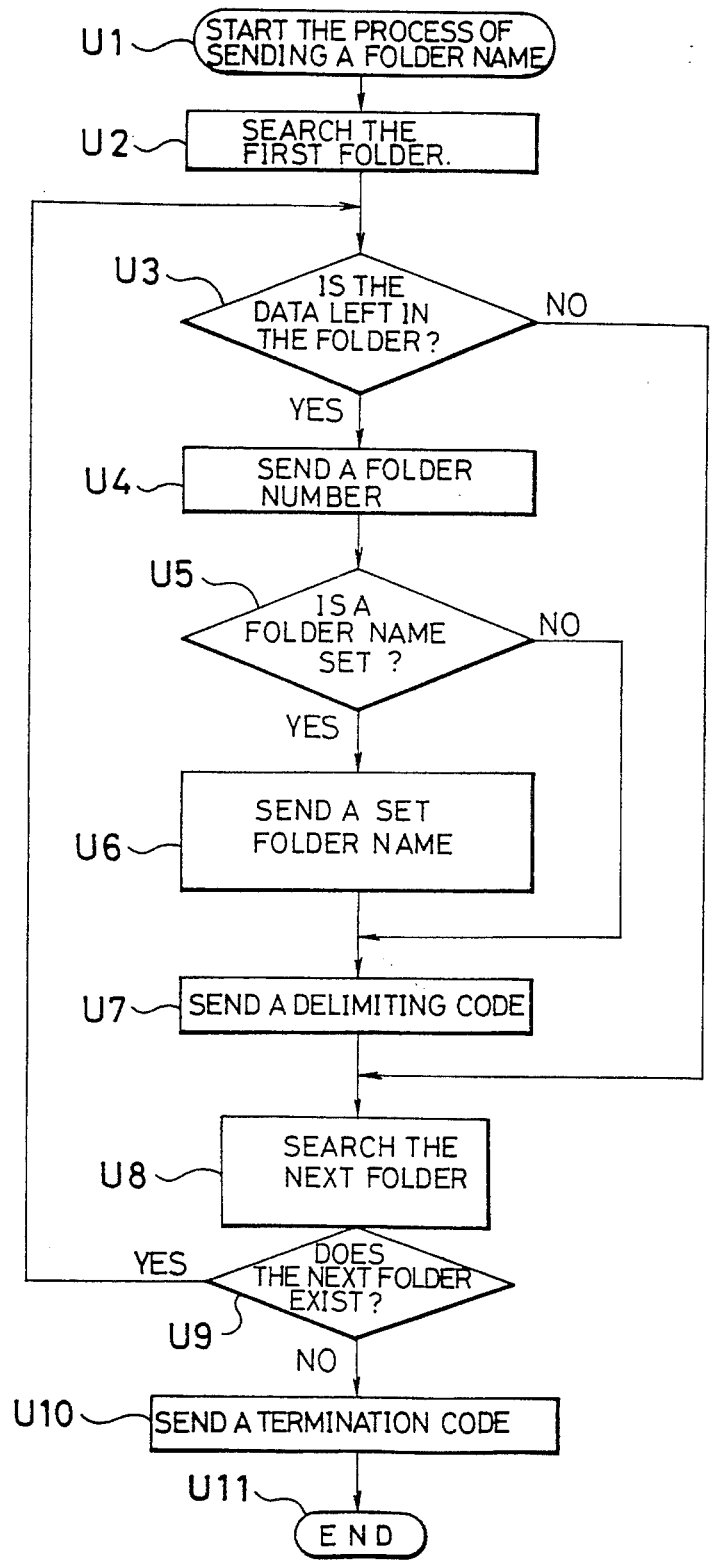
FIG. 8 is a flowchart for explaining the operation of sending a folder name on the side of the small-sized personal instrument composing the communicating system shown in FIG. 4.
Figure 9:
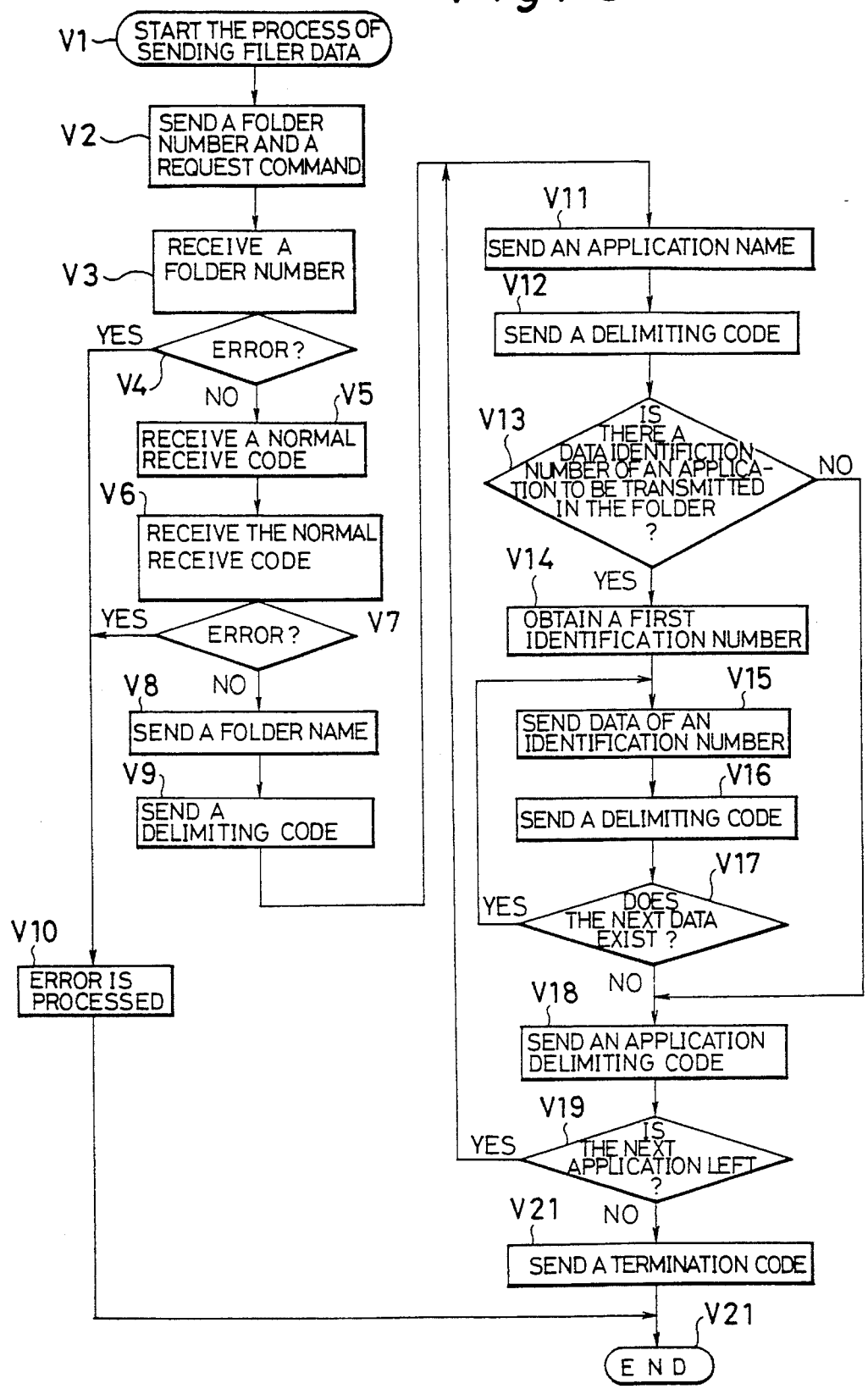
FIG. 9 is a flowchart for explaining the operation of sending filer data on the side of the small-sized personal instrument composing the communicating system shown in FIG. 4.

On the side of the small-sized personal instrument 19, as shown in the flowchart of FIG. 8, a folder number and a folder name of the folder having the data registered therein are sent on the format indicated by a folder name transfer format shown in FIG. 11.

Now, referring to the flowchart shown in FIG. 8, processing for sending a folder name on the side of the small-sized personal instrument 19 will be described below.

First, starting the process of sending a folder name (step U1), then searching the first folder (step U2), and checking whether or not data is left in the folder (step U3). If no data is left in the folder at step U3, then proceeds to step U8 (describe later). If the data is left in the folder at step U3, then sending a folder number (step U4), and checking whether or not a folder name is set (step U5). If the folder name is not set at step U5, then proceeds to step U7 (describe later). If the folder name is set at step U5, then sending a set folder name (step U6), sending a delimiting code (step U7), searching a next folder (step U8), and then checking whether or not the next folder exists (step U9). If the next folder exists at step U9, then returns to step U3. If the next folder does not exist at step U9, then sending a termination code (step U10), and end the process (step U11).

Next, referring to the flowchart shown in FIG. 9, the processing for sending filer data on the side of the small-sized personal instrument 19 will be describe below.

First, start the process of sending filer data (step V1), sending a folder number and a request command (step V2), receiving a folder number (step V3), and checking whether or not it is an error (step V4). If it is an error at step V4, then executing an error processing (step V10), and terminating the process (step V21).

On the other hand, if it is not an error at step V4, then sending a normal receive code (step V5), receiving the normal receive code (step V6), and checking whether or not it is an error (step V7).

If it is an error at step V7, then proceeds to step V10 and V21 as described above.

If it is not an error at step V7, then sending the folder name (step V8), sending delimiting code (step V9), sending an application name (step V11), sending delimiting code (step V12), and checking whether or not there is a data identification number of an application to be transmitted in the folder (step V13). If there no data identification number exist at step V13, then proceeds to step V18 (describe later).

If there exists data identification number at step V13, then obtaining a first identification number (step V14), sending data of identification number (step V15), setting delimiting code (step V18), and checking whether or not a next data exists (step V17).

If there exists the next data at step V17, then returns to step V15. On the other hand, if no next data exists at step V17, then sending the delimiting code of application (step V18), and checking whether or not there exists a next application (step V19). If the next application exists at step V19, then returns to step V11. On the other hand, if the next application does not exist at step V19, then sending the termination code (step V20) and ending the process (step V21).

Next, referring to the flowchart of FIG. 10, the processing for receiving filer data on the side of the personal computer 19 will be described below.

Start a process of receiving filer data (step W1), sending a command for requesting to send a folder name (step W2), receiving a folder name (step W3), and checking whether or not it is an error (step W4). If it is an error at step W4, then ends the process (step W23).

If it is not an error at step W4, then processing a folder selection (step W5), and checking whether or not a folder is selected (step W6). If a folder is not selected at step W6, then proceeds to step W13.

If a folder is selected at step W6, then sending a command for requesting to send filer data (step W7), receiving a request for sending a folder number (step W8), and checking whether or not it is an error (step W9). If it is an error at step W9, then proceeds to step W13.

If it is not an error at step W9, then sending a number of selected folder (step W10), receiving a normal receive code (step W11), and checking whether or not it is an error (step W12). If it is an error at step W12, then proceeds to step W13. If it not an error at step W12, then sending a normal receive code (step W14), receiving a folder name (step WA), checking whether or not it an error (step WB), receiving an application name (step W15), and checking whether or not it is an error (step W16).

If it is an error at step W16, then proceeds executing an error processing (step W21), and ending the process (step W23).

If it is not an error at step W16, then checking whether or not a termination code is received (step W17).

If the termination code is received at step W17, then ending the process (step W23).

If the termination code is not received at step W17, then proceeds to step W21. If the termination code is not received at step W17, then receiving one data item (step W18) and checking whether or not it is an error (step W19).

If it is an error at step W19, then proceeds to step W21. If it is not an error at step W19, then checking whether or not an application delimiting code is received (step W20). If the application delimiting code is not received at step W20, then returns to step W18, and if the application delimiting code is received at step W20, then returns to step W15.

Herein, the folder number corresponds to No. 1 to No. 15 shown in FIG. 2. These numbers are not changed by a user. However, the folder name can be changed by a user.

On the personal computer 18, the received folder name is displayed as a menu so that a user can select a folder whose data i s to be received.

If the folder is selected, from the personal computer 18, a command for requesting to send filer data is sent to the small-sized personal instrument 19.

In response to the command for requesting to send the filer data, the small-sized personal instrument 19 sends the command for requesting to send a folder number to the personal computer 18 for inquiring a folder in which data is held.

In response to the command for requesting to send this folder number, the personal computer 18 operates to send the number of the selected folder.

When receiving the folder number, the small-sized personal instrument 19 sends it at each application based on the data identification number registered in the folder.

Figure 12:
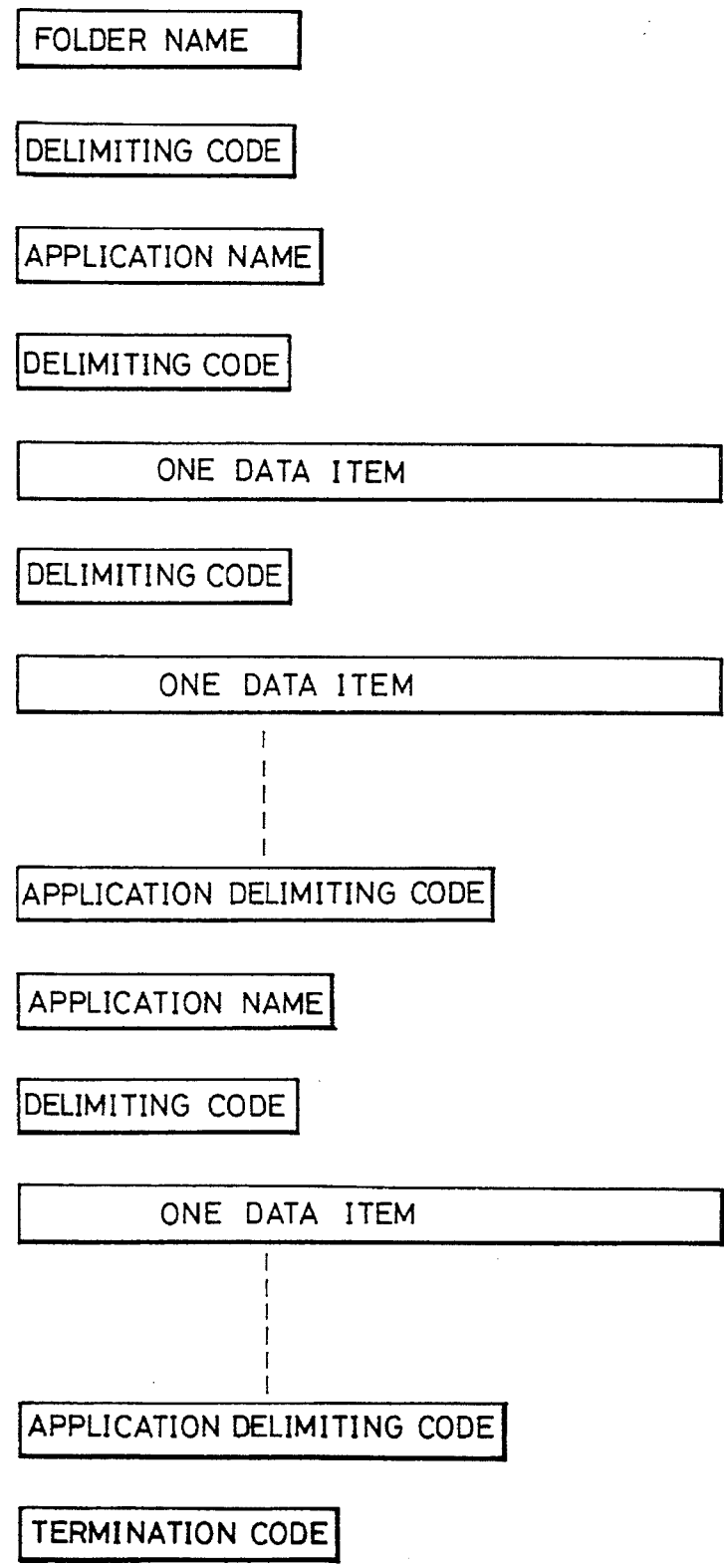
FIG. 12 is an explanatory view showing one example of a filer data transfer format.

FIG. 12 shows a transmitting format used for that purpose.

The transmitting format is a transfer format for the filer data as shown in FIG. 12. At first, the name of the application is sent and then the data of the application is sent. An application-delimiting code is sent, and the name and the data of the next application are sent.

Until sending the data of all the application is terminated, this process is repeated. After sending the data of the final application, a termination code is sent for terminating the transfer.

As mentioned above, by using the name of the application, the data of the application, and the application-delimiting code, it is possible to transmit to the receiving side which application the data in the specified folder belongs to.

Figure 13:
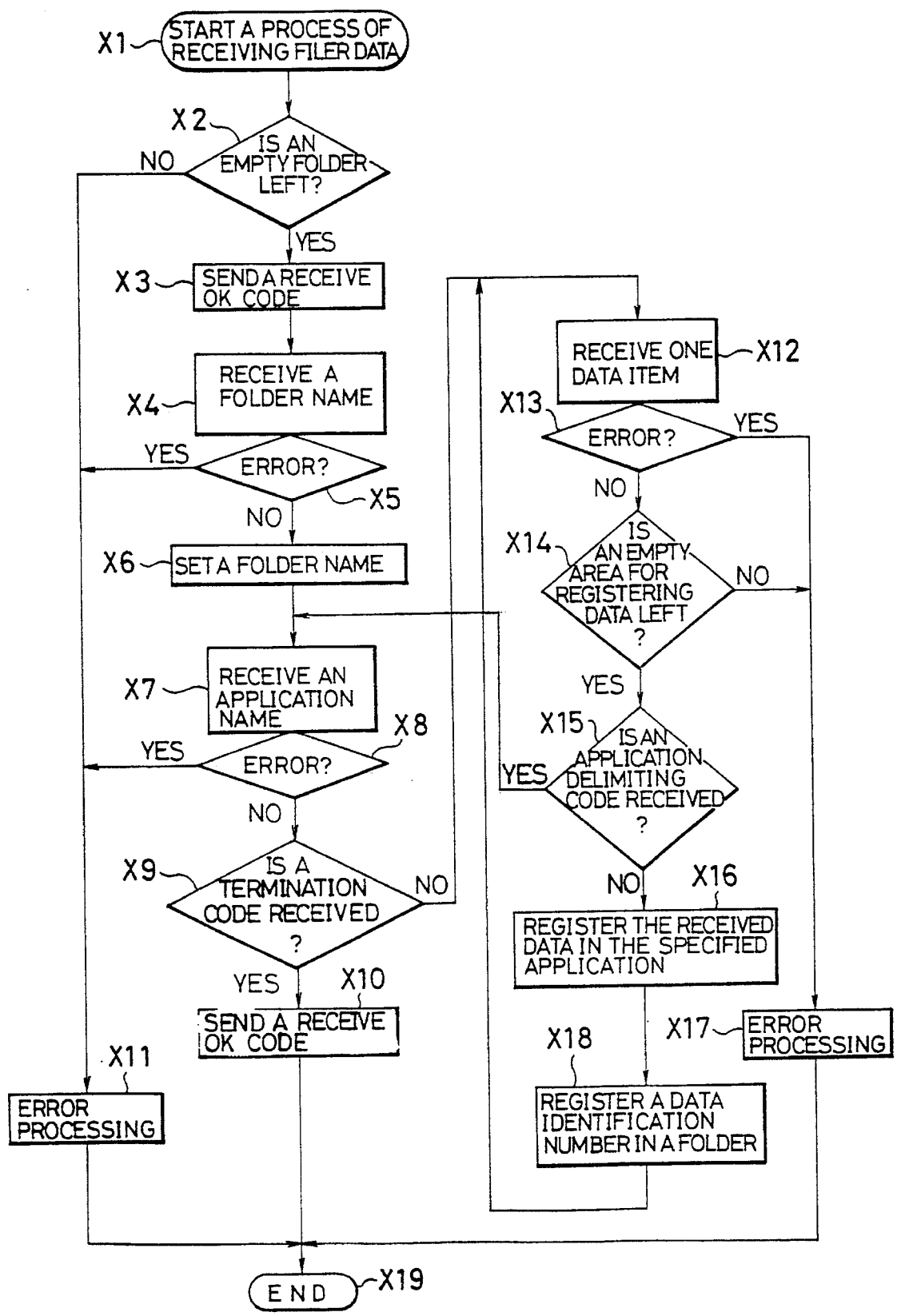
FIG. 13 is a flowchart for explaining the operation of receiving filer data on the side of the small-sized personal instrument composing the communicating system shown in FIG. 4.
Figure 14:
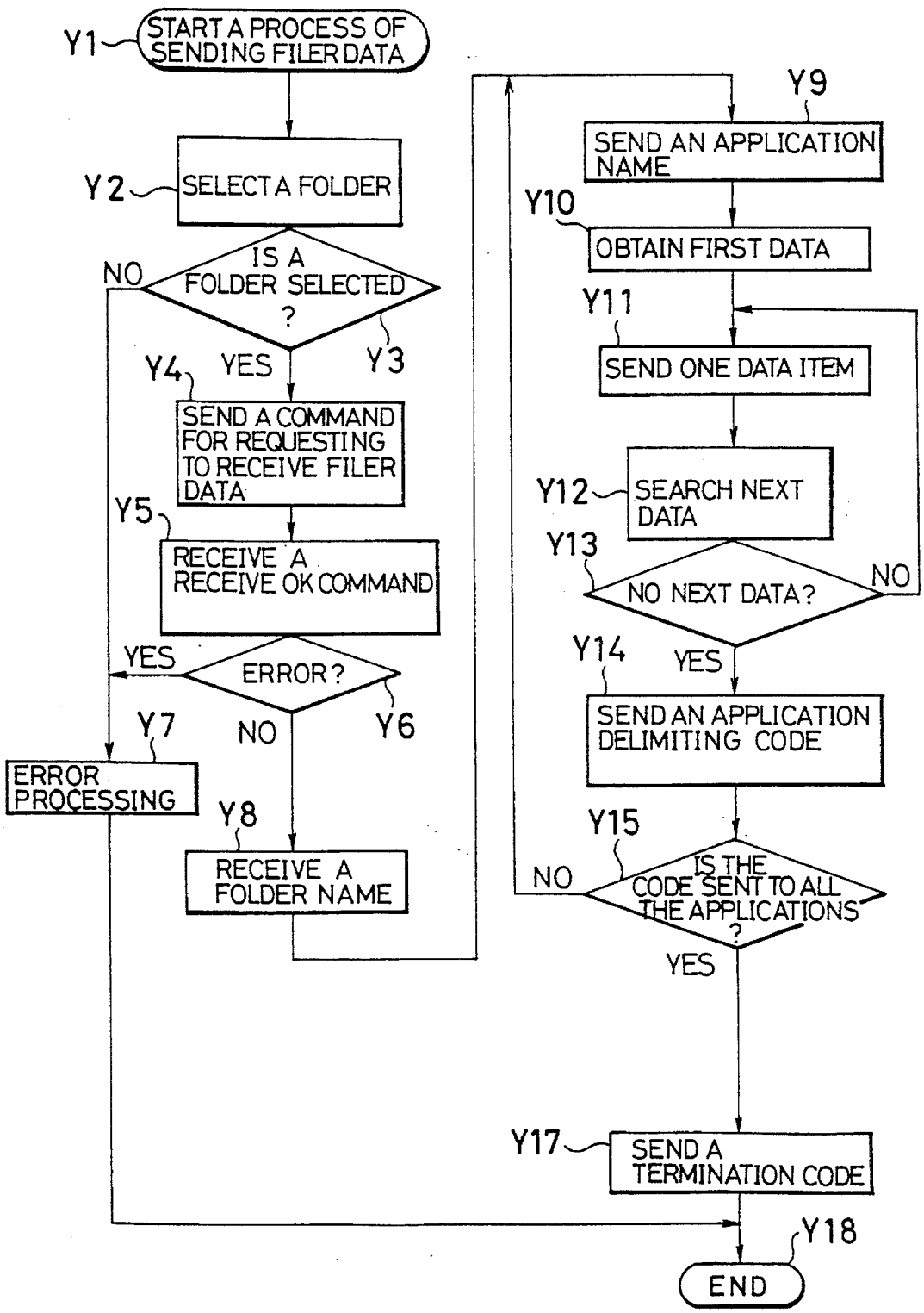
FIG. 14 is a flowchart for explaining the operation of sending filer data on the side of the personal computer composing the communicating system shown in FIG. 4.

Next, the receipt of the filer data (from the personal computer 18 to the small-sized personal instrument) will be described as referring to a flowchart for executing the communication processing on the side of the small-sized personal instrument 19 shown in FIG. 7, a flowchart for receiving filer data on the side of the small-sized personal instrument 19 shown in FIG. 13, and a flowchart for sending filer data on the side of the personal computer 18 shown in FIG. 14.

Referring to the flowchart of FIG. 13, the processing for receiving filer data on the side of the small-sized personal instrument will be described below.

Start a processing of receiving filer data (step X1), and checking whether or not there exists an empty folder (step X2). If no empty folder exists at step X, then proceeds to an error processing (step X11), and ending the process (step X19).

If an empty folder exists at step X2, then sending a receive OK code (step X3), receiving a folder name (step X4), and checking whether or not it is an error (step X5). If it is an error at step X5, then proceeds to step X11. On the other hand, if it is not an error at step X5, then setting a folder name (at step X6), receiving an application name (step X7), and checking whether or not it is an error (step X8). If it is an error at step X8, then proceeds to step X11. On the other hand, if it is not an error at step X8, then checking whether or not a termination code is received (step X9). If an application delimiting code is not received at step X9, then receiving one item data (step X12), and checking whether or not it is an error (step X13). If it is an error at step X13, then executing an error processing (step X17) and ending the process (step X19).

On the other hand, if it is not an error at step X13, checking whether or not there exists an empty area for registering data (step X14).

If no empty area exists at step X14, then proceeds to step X17. On the other hand, if there is an empty area at step X17, then checking whether or not an application delimiting code is received (step X15). If an application delimiting code is not received at step X15, then returns to step X7. On the other hand, if no application delimiting code is received at step X15, then registering a received data in a specified application (step X16), registering a data identification number in a folder (step X18), and returns to step X12.

If an application delimiting code is received at step X9, sending a receive OK code (step X10), and ending the process (step X19).

Next, referring to the flowchart in FIG. 14, the processing for sending filer data on the side of the personal computer 18 will be described below.

Start a process of sending filer data (step Y1), processing a folder selection (step Y2), and checking whether or not a folder is selected (step Y3). If no folder is selected at step Y3, then executing an error processing (step Y7), and ending the process (step Y18).

If a folder is selected at step Y3, then sending a command for requesting to receive filer data (step Y4), receiving a receive OK command (step Y5), and checking whether or not it is an error (step Y6). If it is an error at step Y6, proceeds to step Y7. On the other hand, if it is not an error, then sending a folder name (step Y8), sending an application name (step Y9), obtaining a first data (step Y10), sending one item data (step Y11), searching a next data (step Y12), and checking whether or not there exists data (step Y13).

If no data exists at step Y13, then returns to step Y11. If data exists at step Y13, then sending an application delimiting code (step Y14), and checking whether or not all application are sent (step Y15). If all application are not sent at step Y15, then returns to step Y9. On the other hand, if all application are sent at step Y15, then sending a termination code (step Y17), and ending the process (step Y18).

On the personal computer 18, the selecting process is carried out for selecting a folder whose data is to be sent. To send the data of the selected folder, a command for requesting to send the filer data is sent to the small-sized personal instrument 19.

In response to this command, the small-sized personal instrument 19 operates to check whether or not there exists an empty folder for storing data in the small-sized personal instrument 19, and if it exists, sends a code indicating the receive is all right (OK code) to the personal computer 18.

In response to the receive OK code, the personal computer 18 operates to send the data to the small-sized personal instrument 19 according to the format shown in FIG. 12.

Since the data is transferred on the format shown in FIG. 12, in response to the folder name, the small-sized personal instrument 19 sets the folder name (11*e* of FIG. 2) to an empty folder having the smallest number. Then, the name and the data of the application to be transmitted next are registered as data of each application. By registering the data identification number to the folder, the data of the filer in the personal computer 18 is allowed to be sent to the small-sized personal instrument 19.

As mentioned above, by sending the data registered as the data of a filer with a certain relation according to a user in a form of a combination of an application name, one data piece, and an application-delimiting code, on the receiving side, the data can be registered as keeping the relation.

What is claimed is:

1. A data communicating apparatus, for communicating data with another apparatus, comprising:

a first storing means for storing a plurality of application programs;

a second storing means having a plurality of partitioned areas for storing data of said plurality of application programs and identification numbers which identify the data as corresponding to respective ones of said application programs respectively, and having a managing area for storing identification numbers of at least one group of data, each stored in one of said partitioned areas;

an output means, connected to said second storing means, for outputting said group of data to another apparatus;

a control means, connected to said first storing means, to said second storing means and to said output means, for controlling said second storing means to store each of said group of data with corresponding ones of said identification numbers in said managing area, and for controlling said output means to output said group of data with said identification numbers in said managing area;

an input means, connected to said control means, for inputting data and instructions, including a plurality of function keys for inputting one of said identification numbers into said managing area, when one of said plurality of function keys is pressed, in an operation of one of said plurality of application programs; and a display means, connected to said control means, for displaying said data and instructions inputted by said input means.

2. A data communication apparatus according to claim 1, wherein said control means controls said display means to display a list of said group of data.

3. A data communication apparatus according to claim 2, wherein said control means controls said input means, second storing means and said display means to display and to correct one of said group of data with a simple key operation.

4. A data communication apparatus according to claim 1, wherein said second storing means has a plurality of managing areas.

5. A data communication apparatus according to claim 1, wherein said control means controls said output means to output each of said group of data with corresponding ones of said identification numbers with a delimiting code.

6. A data communication apparatus according to claim 1, wherein said managing area has a plurality of areas corresponding to each of said plurality of application programs, respectively.

* * * * *